(12) United States Patent
Messerian

(10) Patent No.: US 8,738,072 B1
(45) Date of Patent: May 27, 2014

(54) DEVICES AND METHODS FOR TRANSFERRING A MULTIMEDIA MOBILE CALL DATA FROM A MOBILE DEVICE TO A DEVICE HAVING A DISPLAY

(76) Inventor: Razmig Hagop Messerian, Pasadena, CA (US)

( * ) Notice: Subject to any disclaimer, the term of this patent is extended or adjusted under 35 U.S.C. 154(b) by 291 days.

(21) Appl. No.: 13/154,435

(22) Filed: Jun. 6, 2011

Related U.S. Application Data

(60) Provisional application No. 61/351,903, filed on Jun. 6, 2010.

(51) Int. Cl.
*H04M 1/00* (2006.01)

(52) U.S. Cl.
USPC .......... 455/550.1; 348/14.02; 348/14.04; 379/387.01; 379/388.01; 379/420.01; 455/556.1; 455/557; 455/561

(58) Field of Classification Search
USPC .......... 348/14.01–14.16; 370/259–271, 370/351–357; 455/412.1–426.2, 455/456.1–466, 550.1–560, 575.1–575.9, 455/90.1–90.3, 456.1–560; 709/201–207, 709/217–248
See application file for complete search history.

(56) References Cited

U.S. PATENT DOCUMENTS

| | | | | |
|---|---|---|---|---|
| 7,006,613 | B2* | 2/2006 | Novak et al. | 379/142.01 |
| 7,076,202 | B1* | 7/2006 | Billmaier | 455/3.04 |
| 7,080,154 | B1* | 7/2006 | Inoue et al. | 709/234 |
| 7,330,607 | B2* | 2/2008 | Jung et al. | 382/298 |
| 7,468,980 | B1* | 12/2008 | Casto et al. | 370/395.52 |
| 7,627,313 | B2* | 12/2009 | Aretz et al. | 455/426.1 |
| 7,948,513 | B2* | 5/2011 | Rockefeller et al. | 348/14.08 |
| 7,996,040 | B1* | 8/2011 | Timm | 455/557 |
| 2001/0055951 | A1* | 12/2001 | Slotznick | 455/41 |
| 2004/0264686 | A1* | 12/2004 | Enzner | 379/406.08 |
| 2005/0289626 | A1* | 12/2005 | Aboulgasem et al. | 725/106 |
| 2006/0203758 | A1* | 9/2006 | Tee et al. | 370/315 |
| 2007/0220108 | A1* | 9/2007 | Whitaker | 709/217 |
| 2008/0291260 | A1* | 11/2008 | Dignan et al. | 348/14.02 |
| 2009/0033736 | A1* | 2/2009 | Thomason | 348/14.02 |
| 2009/0074189 | A1* | 3/2009 | Ryu et al. | 380/277 |
| 2010/0037272 | A1* | 2/2010 | Lin | 725/81 |
| 2010/0279647 | A1* | 11/2010 | Jacobs et al. | 455/404.1 |
| 2011/0074794 | A1* | 3/2011 | Felt et al. | 345/520 |

* cited by examiner

*Primary Examiner* — Hemant Patel
(74) *Attorney, Agent, or Firm* — Loza & Loza, LLP; Razming H. Messerian

(57) ABSTRACT

One feature discloses a method operational at a multimedia mobile call transfer device, the method comprising: receiving a first video data associated with a multimedia call from a mobile device; receiving a first audio data associated with the multimedia call from the mobile device; processing the received first video data and the received first audio data; transmitting the processed first video data to a multimedia device for display on the multimedia device; and transmitting the processed first audio data to the multimedia device for play on speakers of the multimedia device.

19 Claims, 9 Drawing Sheets

DEVICES AND METHODS FOR TRANSFERRING A MULTIMEDIA MOBILE CALL DATA FROM A MOBILE DEVICE TO A DEVICE HAVING A DISPLAY

CLAIM OF PRIORITY

The present Application for Patent claims priority to Provisional Application No. 61/351,903 entitled "Video/Audio Mobile Call Transfer Device" filed Jun. 6, 2010, the entire disclosure of which is hereby expressly incorporated by reference.

BACKGROUND

1. Field

Various embodiments of the present application pertain to systems, devices, and methods for transferring a multimedia mobile call from a mobile device to a multimedia device having a display.

2. Background

In recent years, mobile phones and mobile device networks have increased their ability and capacity to transfer data at exceedingly higher data rates. With the advent of 3G and 4G wireless networks, mobile phones and mobile device networks are now better equipped to process multimedia applications, such as streaming video and music. Moreover, mobile phones are now commonly equipped with cameras that are able to take pictures as well as record video data. Additionally, mobile phones can now initiate (e.g., place) and receive (e.g., answer) multimedia mobile calls (e.g., mobile calls having video and audio content) with other similarly equipped multimedia call devices, such as other mobile phones, laptops, and fixed terminals. Technology advances in mobile device networks, including increased bandwidth per user, have made it possible to efficiently transmit and receive high data rate mobile video calls.

However, mobile phones, due to their small size, have small display screens that may make it difficult or undesirable to display multimedia calls having video content. For example, a small 4 inch mobile phone display makes it difficult for a user to see significant detail of video images received from a multimedia call. Moreover, mobile phones typically have a small speaker(s) that significantly limits the volume. Therefore, there is a need for systems, methods, and devices that allows a mobile phone to transfer image and/or sound data received during a multimedia call to a larger display that may include larger speakers, such as a television set, or computer display terminal. This would allow a user to initiate or receive a video call, for example at home, with a large display in order to better view the video images being sent by the other party to the video call.

SUMMARY

In one feature a multimedia mobile call transfer device is disclosed, comprising: a first communications interface adapted to provide a wireless communications link with a mobile device; a second communications interface adapted to provide another communications link with a multimedia device; and a processing circuit communicatively coupled to the first communications interface and the second communications interface, the processing circuit adapted to receive a first video data associated with a multimedia call from the mobile device, process the received first video data, and transmit the processed first video data to the multimedia device for display on the multimedia device. In one embodiment, the processing circuit is further adapted to: receive a first audio data associated with the multimedia call from the mobile device; process the received first audio data; and transmit the processed first audio data to the multimedia device for play on speakers of the multimedia device. In another embodiment, the multimedia mobile call transfer device further comprises a video camera communicatively coupled to the processing circuit, the video camera adapted to capture a second video data; and wherein the processing circuit is further adapted to transmit the captured second video data to the mobile device.

In another embodiment, the multimedia mobile call transfer device further comprises a microphone communicatively coupled to the processing circuit, the microphone adapted to record a second audio data; and wherein the processing circuit is further adapted to transmit the recorded second audio data to the mobile device. In another embodiment, the multimedia mobile call transfer device, further comprises an input interface communicatively coupled to the processing circuit, the input interface adapted to receive an initiation command from a user, wherein upon receipt of the initiation command from the user the processing circuit is further adapted to: transmit an initiation message to the mobile device requesting that the mobile device commence transmission of the first video data associated with the multimedia call to the multimedia mobile call transfer device.

In another embodiment, the processing circuit is further adapted to: establish a shared secret key with the mobile device; and derive a session key based on the shared secret key, wherein the received first video data is encrypted by the session key, and the session key is used to decrypt the encrypted received first video data. In yet another embodiment, the processing circuit is further adapted to: transmit a ranging signal to the mobile device; and receive a range acknowledgement message from the mobile device indicating that the wireless communications link is within a minimum signal to noise ratio (SNR) threshold.

In another embodiment, after receiving the range acknowledgement message from the mobile device the processing circuit is further adapted to: transmit an initiation message to the mobile device requesting that the mobile device commence transmission of the first video data associated with the multimedia call to the multimedia mobile call transfer device. In another embodiment, the video camera is further adapted to detect the face of a user and zoom in on the face of the user. In another embodiment, the multimedia mobile call transfer device further comprises: a video camera communicatively coupled to the processing circuit, the video camera adapted to capture a second video data; and a microphone communicatively coupled to the processing circuit, the microphone adapted to record a second audio data, wherein the processing circuit is further adapted to synchronize the captured second video data with the recorded second audio data in time, and transmit the synchronized second video data with the second audio data to the mobile device.

In another feature a method operational at a multimedia mobile call transfer device is disclosed, the method comprising: receiving a first video data associated with a multimedia call from a mobile device; receiving a first audio data associated with the multimedia call from the mobile device; processing the received first video data and the received first audio data; transmitting the processed first video data to a multimedia device for display on the multimedia device; and transmitting the processed first audio data to the multimedia device for play on speakers of the multimedia device.

In another feature, a multimedia mobile call transfer device is disclosed, comprising: a communications interface adapted to provide a wireless communications link with a mobile device; a display device adapted to display a first video data associated with a multimedia call; a speaker device adapted to play a first audio data associated with the multimedia call; and a processing circuit communicatively coupled to the communications interface, the display device, and the speaker device, the processing circuit adapted to receive the first video data and the first audio data associated with the multimedia call from the mobile device, process the first video data and the first audio data, transmit the processed first video data to the display device to display the processed first video data, and transmit the processed first audio data to the speaker device to play the processed first audio data.

In one embodiment, the multimedia mobile call transfer device further comprises: a microphone communicatively coupled to the processing circuit, the microphone adapted to record a second audio data; and a video camera communicatively coupled to the processing circuit, the video camera adapted to capture a second video data, wherein the processing circuit is further adapted to process the captured second video data and the recorded second audio data, and transmit the processed second video data and the processed second audio data to the mobile device. In another embodiment, processing the captured second video data and the recorded second audio data includes: synchronizing the captured second video data with the recorded second audio data in time.

DETAILED DESCRIPTION

In the following description numerous specific details are set forth in order to provide a thorough understanding of the invention. However, one skilled in the art would recognize that the invention might be practiced without these specific details. In other instances, well known methods, procedures, and/or components have not been described in detail so as not to unnecessarily obscure aspects of the invention.

In the following description, certain terminology is used to describe certain features of one or more embodiments of the invention. For example, a "multimedia call" and a "multimedia mobile call" are used interchangeably throughout this application to refer to a mobile device telephone (e.g., cellular telephone) call that includes both video and audio data components. The word "exemplary" as used herein means "serving as an just one illustration or specimen."

Exemplary Communication Environment

Figure 1:
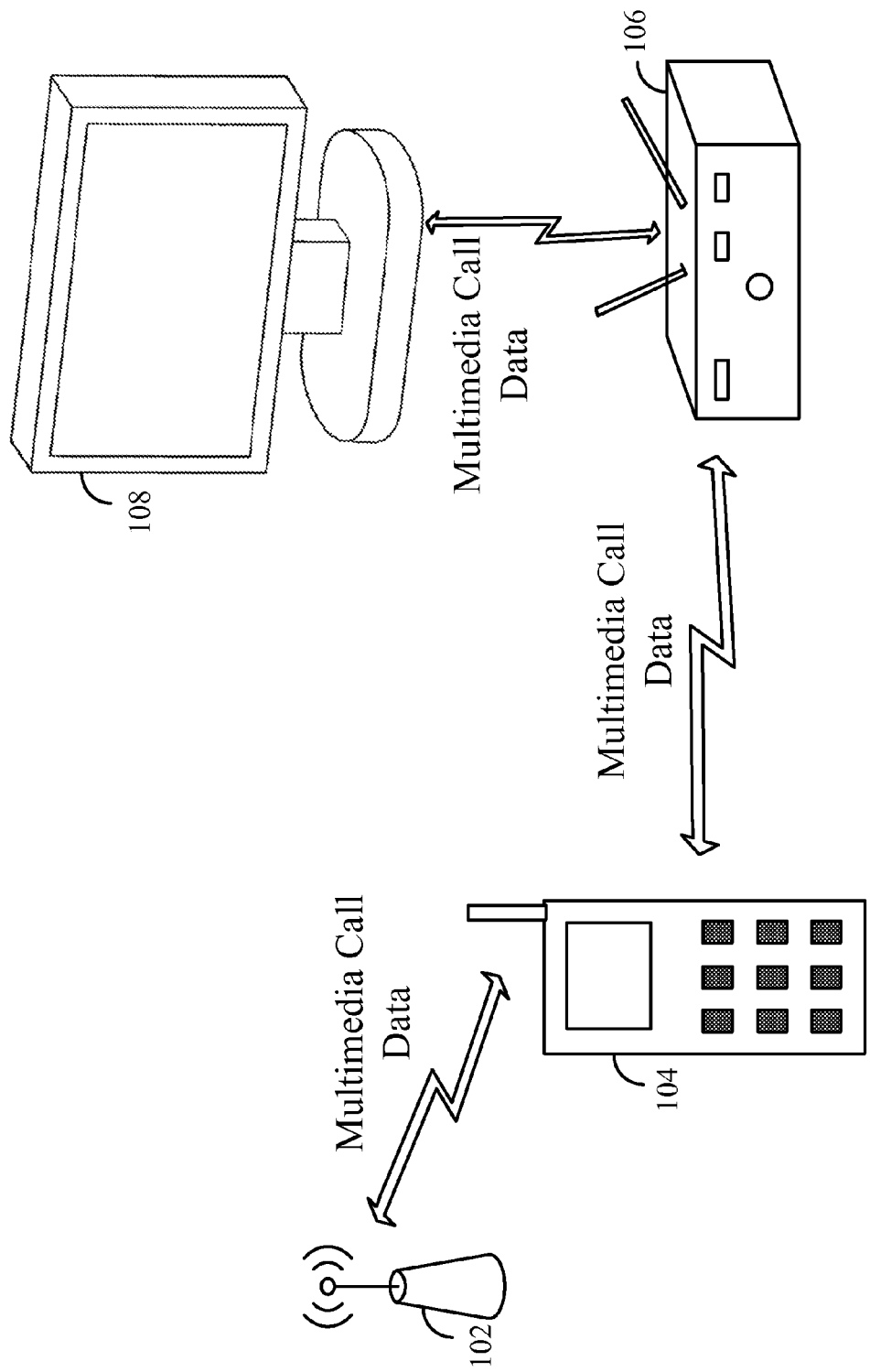
FIG. 1 illustrates an exemplary communications environment including a multimedia mobile call transfer device.

FIG. 1 illustrates an exemplary communications environment including a multimedia mobile call transfer device 106. Multimedia call data (e.g., video and audio telephone call data) associated with a multimedia call may be exchanged between a network node 102 (e.g., a base station of a wireless communications cellular network) and a mobile device 104 over a wireless communications link. The multimedia call may have been initiated (i.e., placed) by the mobile device 104, or initiated by another mobile device in the communications network and received (i.e., answered) by the mobile device 104. A user of the mobile device 104 who is engaged in the multimedia call may desire to transfer the data associated with the multimedia call to a multimedia device 108, such as a television set, laptop computer, or desktop computer. The multimedia mobile call transfer device 106 may then assist in transmitting multimedia call data associated with the multimedia call to the multimedia device 108.

For example, the multimedia mobile call transfer device 106 may wirelessly receive multimedia call data associated with the multimedia call from the mobile device 104 through, for example, a Bluetooth wireless connection protocol. The multimedia mobile call transfer device 106 may then transmit video telephone call data associated with the multimedia call to the multimedia device 108 for display on a display screen of the multimedia device 108. The video telephone call data may be transmitted to the multimedia device 108 wirelessly or over a wireline connection, such as an HDMI, RCA, S-video, etc. connection. Additionally, the multimedia mobile call transfer device 106 may transmit audio telephone call data associated with the multimedia call to the multimedia device 108 for play on speakers of the multimedia device 108. Similarly, the audio telephone call data may be transmitted to the multimedia device 108 wirelessly or over a wireline connection, such as an HDMI, RCA, etc. connection. The display and speakers of the multimedia device 108 may be considerably larger and more powerful than the display and speakers of the mobile device 104 thereby improving the perceived quality of the multimedia call by the user.

Images and/or sounds generated by the user may also be recorded by multimedia mobile call transfer device 106 and transmitted back to the mobile device 104. The mobile device 104 may in turn transmit this data to the network node 102, which in turn transmits the data to the other mobile device via the cellular network associated with the network node 102. In this fashion, the user may utilize the multimedia mobile call transfer device 106 to transmit multimedia data associated with the multimedia call to the multimedia device 108, and if desired, capture video and/or audio data generated by the user for the multimedia call using the multimedia mobile call transfer device 106 and transmit this video and/or audio data to the mobile phone 104.

Exemplary Mobile Device

Figure 2:
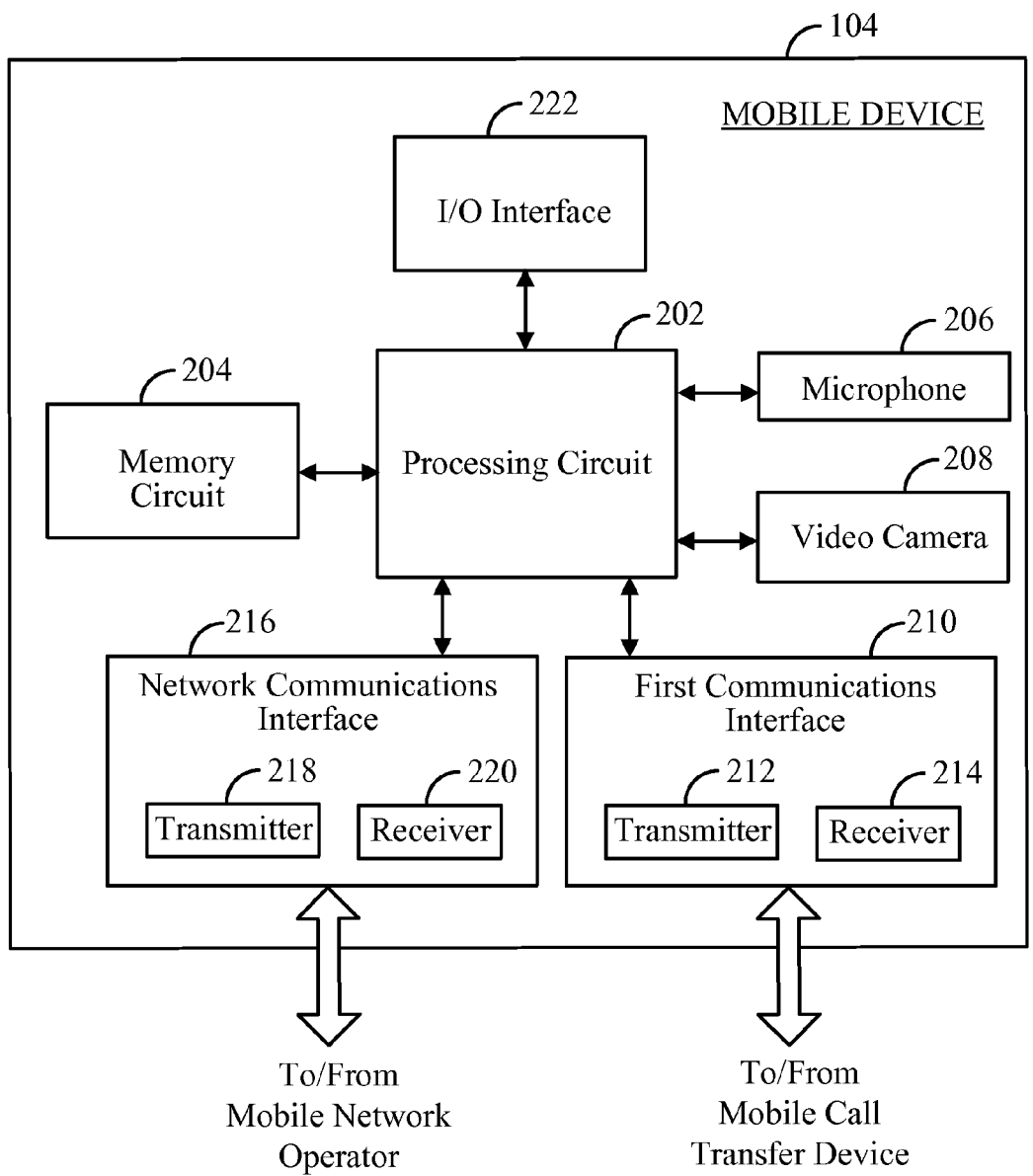
FIG. 2 illustrates a functional block diagram of a mobile device according to one example.

FIG. 2 illustrates a functional block diagram of a mobile device 104 according to one example. The mobile device 104 may be a cellular telephone, a personal digital assistant (PDA), a smart phone, or any other portable electronic communication device that is capable of initiating and receiving multimedia calls. The mobile device 104 may comprise a processing circuit (e.g., processor, application specific integrated circuit (ASIC), processing module, etc.) 202, memory circuit (e.g., memory module, memory, etc.) 204, a microphone 206, a video camera 208, a first communications interface 210, a network communications interface 216, and/or an input and output (I/O) interface 222.

The processing circuit 202 is configured to process video and audio data, and may be an ASIC or a specialized processor. The memory circuit 204 may be volatile and/or non-volatile memory that is adapted to store data, such audio and video data. The memory circuit 204 may also store instructions which when executed by the processing circuit 202 performs steps operational at the mobile device 104. The microphone 206 is adapted to capture audio data, for example, audio data generated by a user for use in a multimedia call. The video camera 208 is adapted to capture digital images and digital video, for example, video data generated by a user for use in a multimedia call.

The first communications interface 210 allows the mobile device 104 to wirelessly communicate with the multimedia mobile call transfer device 106. The first communications interface 210 may include a transmitter 212 and a receiver 214 that each respectively transmit and receive multimedia call data to/from the multimedia mobile call transfer device 106. The first communications interface 210 may use a Bluetooth®, Bluetooth Low Enegry®, Zigbee®, Wifi, 802.11 standard, and/or another wireless communications protocol that is capable of transmitting and receiving data at rates which can support the transmission and reception of high definition video data and audio data. For example, in one embodiment, the first communications 210 interface can establish a wireless communications link with the multimedia mobile call transfer device 106 that can support the transmission and reception of up to 10 Megabits per second. In another embodiment, the first communications interface 210 can establish a wireless communications link with the multimedia mobile call transfer device 106 that can support the transmission and reception of up to 100 Megabits per second. In yet another embodiment, the first communications interface 210 can establish a wireless communications link with the multimedia mobile call transfer device 106 that can support the transmission and reception of up to 1000 Megabits per second.

The network communications interface 216 may include a transmitter 218 and a receiver 220 to transmit and receive multimedia call data to/from the network node 102. Thus, the network communications interface 216 allows the mobile device 104 to initiate and receive multimedia calls with other mobile devices in the communications network. The communications network may be a conventional mobile device network, such that uses frequency division multiple access (FDMA), time division multiple access (TDMA), and code division multiple access (CDMA), Advanced Mobile Phone Service (AMPS), Global System for Mobile (GSM), Interim Standard 95 (IS-95) and its derivatives, IS-95A, IS-95B, ANSI J-STD-008 (often referred to collectively herein as IS-95), 3G, 3G Long Term Evolution (LTE), and/or $4^{th}$ generation (4G) networks. The use of such over the air communication standards are within the scope of the communication protocols and technology with which the mobile device 104 may communicate to other mobile devices in the communications network via network node 102. For example, in one embodiment, the communications network supports LTE and/or 4 G communication protocols which allow for fast data rates that can provide superb multimedia call clarity to the mobile device 104.

The I/O interface 222 may include a keyboard and a display. The keyboard allows a user of the mobile device to enter in commands, which for example, may cause the mobile device 104 to initiate multimedia call transmissions to the multimedia mobile call transfer device 106. The keyboard may also be used to launch software applications resident on the mobile device 104 that controls multimedia call transfers to the multimedia mobile call transfer device 106. The display of the mobile device 104 may display video call data associated with a multimedia call to the user.

Exemplary Multimedia Mobile Call Transfer Device

Figure 3:
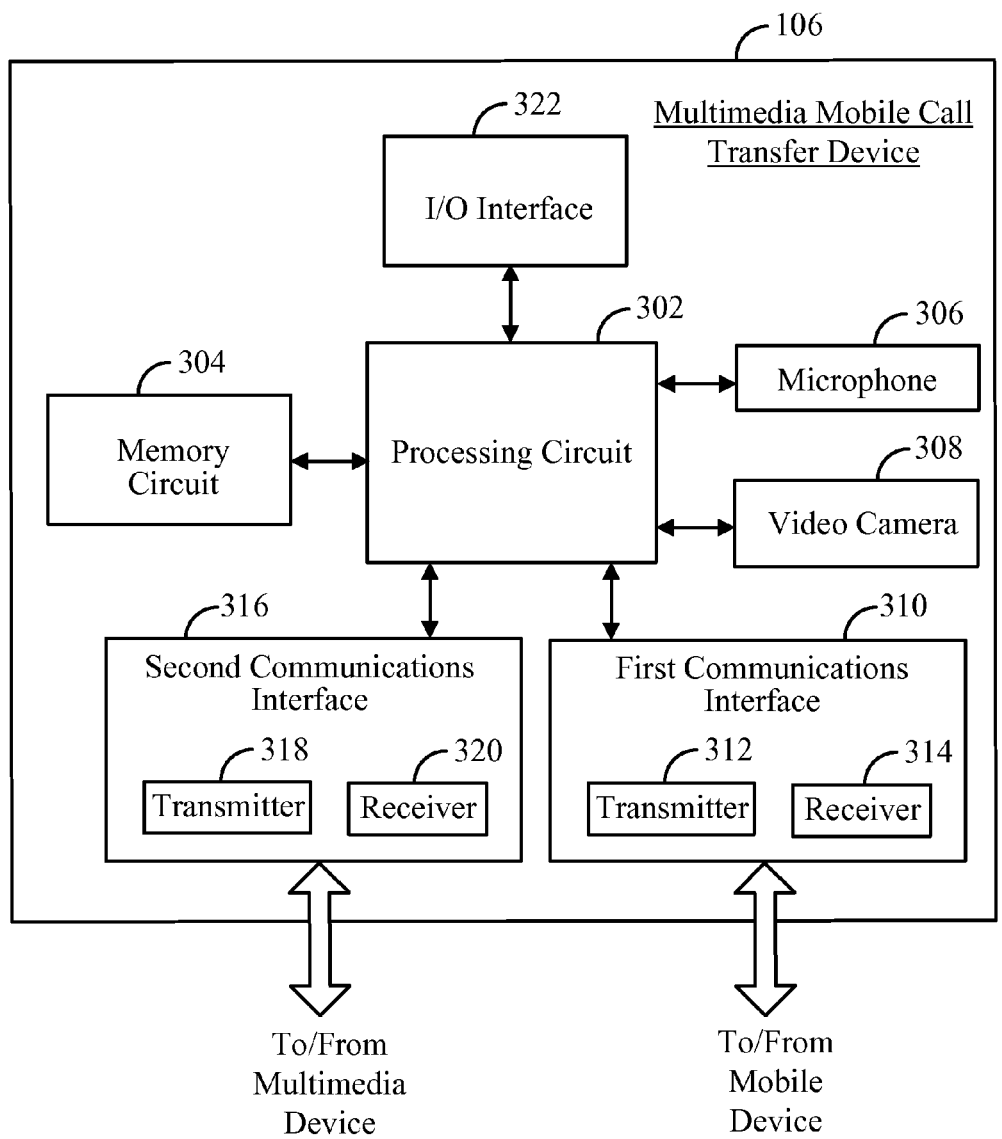
FIG. 3 illustrates a functional block diagram of a Multimedia Mobile Call Transfer Device according to one embodiment.

FIG. 3 illustrates a functional block diagram of a Multimedia Mobile Call Transfer Device 106 according to one embodiment. The Mobile Call Transfer Device 106 may comprise a processing circuit (e.g., processor, application specific integrated circuit (ASIC), processing module, etc.) 302, memory circuit (e.g., memory module, memory, etc.) 304, a microphone 306, a video camera 308, a first communications interface 310, a second communications interface 316, and/or an input and output (I/O) interface 322.

Figure 6:
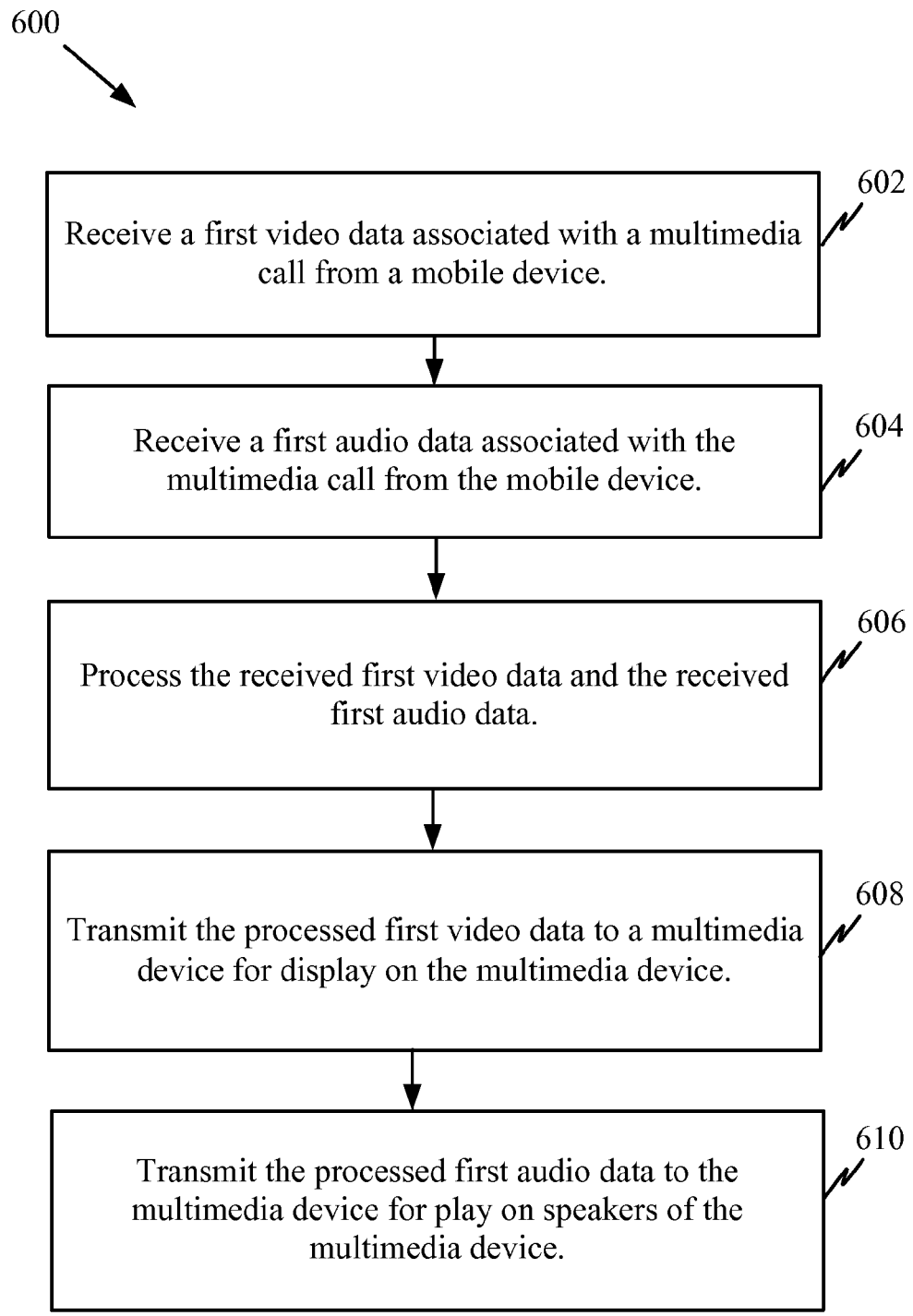
FIG. 6 illustrates a flow chart for a method operational at a multimedia mobile call transfer device according to one embodiment.

The processing circuit 302 is configured to process video and audio data, and may be an ASIC or a specialized processor that is adapted to perform any one of the steps shown in FIG. 6. The processing circuit 302 is adapted to process signals sent to and received from the other mobile call transfer device 106 components, including, but not limited to, the memory circuit 304, microphone 306, video camera 308, first communications interface 310, second communications interface 316, and/or I/O interface 322. For example, the processing circuit 302 may be adapted to decrypt and convert the multimedia call data received from the mobile device 104 to another video/audio data type to be output to the multimedia device 108 via the second communications interface 316. As another example, the processing circuit 302 may be adapted to encrypt and transmit video and/or audio data received from the microphone 306 and/or video camera 308, respectively, to the mobile device 104 via the first communications interface 310. The memory circuit 304 may be volatile and/or non-volatile memory that is adapted to store data, such as audio and video data. The memory circuit 304 may also store instructions which when executed by the processing circuit 302 perform any one of the steps shown in FIG. 6. The microphone 306 is adapted to capture audio data, for example, audio data generated by a user (e.g., the voice of the user) for use in a multimedia call.

The video camera 308 is adapted to capture digital images and digital video, for example, video data generated by a user (e.g., facial images of the user) for use in a multimedia call. The video camera 308 may include a feature that allows it to zoom in on a user's face who might be sitting across the video camera 308 at some distance, for example, 5 to 20 feet. In one embodiment, the location the video camera 308 is focusing in on may be adjusted manually by the user. For example, the video camera 308 may swivel around allowing the user to adjust the video camera's 308 angle by hand. In another embodiment, the location the video camera 308 is focusing in on may be adjusted by remote control. For example, the user may execute a command via the I/O interface 222 of the wireless device to transit a signal to the mobile call transfer device 106 instructing the video camera 308 to swivel into a desired position.

The first communications interface 310 allows the mobile call transfer device 106 to wirelessly communicate with the mobile device 104. Specifically, the first communications interface 310 establishes a wireless connection with the first communications interface 210 of the wireless device 104. The first communications interface 310 may include a transmitter 312 and a receiver 314 that each respectively transmit and receive multimedia call data to/from the mobile device 104. The first communications interface 310 may use a Bluetooth®, Bluetooth Low Enegry®, Zigbee®, Wifi, 802.11 standard, and/or another wireless communications protocol that is capable of transmitting and receiving data at rates which can support the transmission and reception of high definition video data and audio data. For example, in one embodiment, the first communications interface 310 can establish a wireless communications link with the mobile device 104 that can support the transmission and reception of up to 10 Megabits per second. In another embodiment, the first communications interface 310 can establish a wireless communications link with the mobile device 104 that can support the transmission and reception of up to 100 Megabits per second. In yet another embodiment, the first communications interface 310 can establish a wireless communications link with the mobile device 104 that can support the transmission and reception of up to 1000 Megabits per second.

The second communications interface 316 is adapted to communicatively couple the multimedia mobile call transfer device 106 to the multimedia device 108. For example, the second communications interface 316 may include a transmitter 318 that transmits multimedia call data to the multimedia device 108. It may also include a receiver 320 that receives signals from the multimedia device 108. In one embodiment, the second communications interface 316 may establish a wireline communications link with the multimedia device 108 to transmit multimedia call data. For example, the second communications interface 216 may include any one of a Thunderbolt®, RCA, HDMI, DVI, co-axial cable, S-video, and/or any other communications interface that may be found on a multimedia device 108, such as a television or a computer display terminal, that allow the multimedia device 108 to receive audio and/or video data. In another embodiment, the second communication interface 316 may establish a wireless communications link with the multimedia device 108 using anyone of the protocols and data rates used by the first communications interface 310.

The I/O interface 322 may include a plurality of buttons, lights, infrared receivers, and/or displays. One or more buttons, for example, may allow a user to enter commands that causes the mobile call transfer device 106 to transmit signals to the mobile device 104 that establishes a communications link between the two devices in order to transfer multimedia call data. Another button may be used to turn on or off the mobile call transfer device 106.

Figure 4:
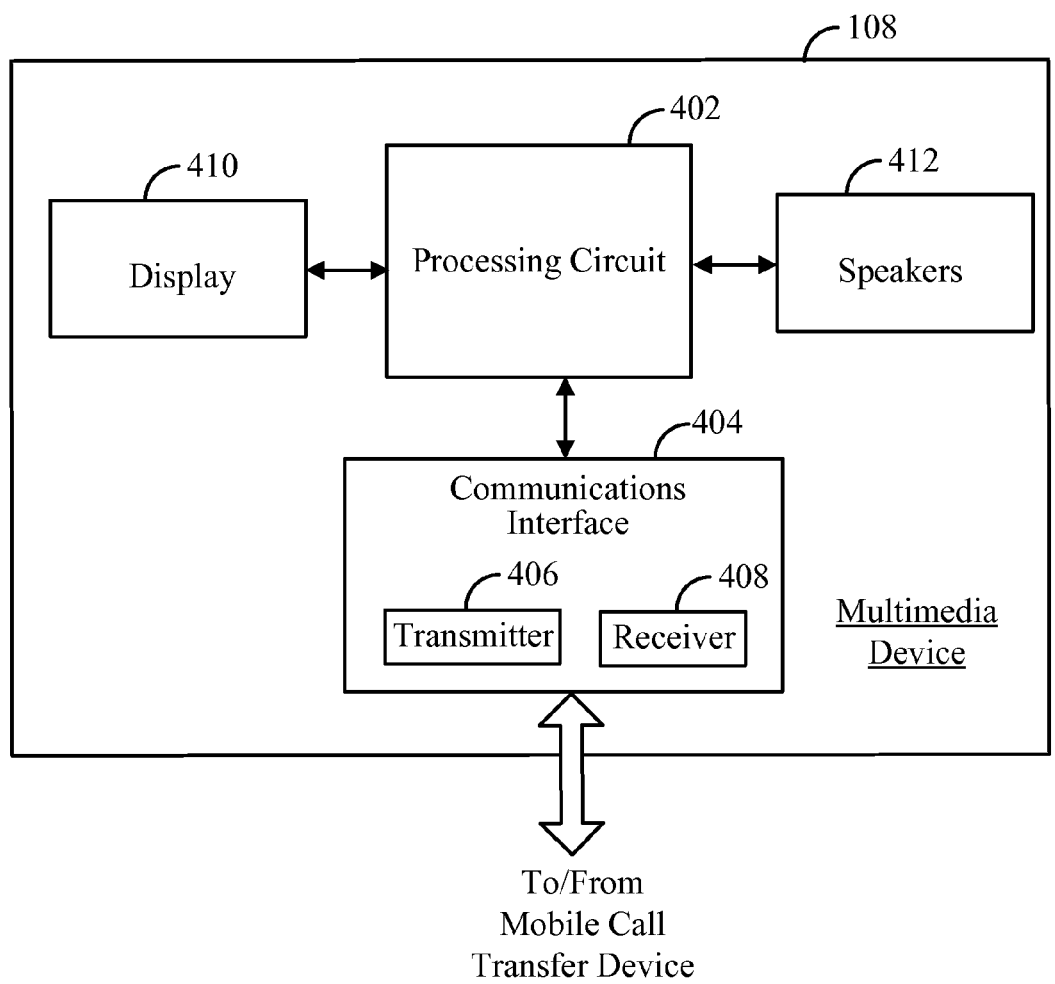
FIG. 4 illustrates a functional block diagram of a multimedia device according to one embodiment.

FIG. 4 illustrates a functional block diagram of a multimedia device 108 according to one embodiment. The multimedia device 108 may be, for example, a television, a computer monitor, a laptop, a desktop computer, a tablet computer, or any electronic device having a display. Preferably the display should be larger than 4 inches (measured diagonally across the screen) so that a user transferring a multimedia call to the multimedia device 108 can utilize a display larger than a typical mobile device 108 (e.g., larger than a typical cellular phone's display). The multimedia device 108 may comprise a processing circuit (e.g., processor, processing module, ASIC, etc.) 402, a communications interface 404, a display device 410, and/or speakers device 412.

The communications interface 404 is adapted to communicatively couple the multimedia device 108 to the second communications interface 316 of the multimedia mobile call transfer device 106. For example, the communications interface 404 may include a receiver 408 that receives multimedia call data from the multimedia device 108. The communications interface 404 may also include a transmitter 406 that transmits signals back to the multimedia mobile call transfer device 106, such as but not limited to, acknowledgment messages that data has been received or error messages if data has not been corrected received correctly. In one embodiment, the communications interface 404 may establish a wireline communications link with the mobile call transfer device 106 to receive multimedia call data. For example, the communications interface 404 may include any one of a Thunderbolt®, RCA, HDMI, DVI, co-axial cable, S-video, and/or any other communications interface that may be found on, for example, a television or a computer display terminal. In another embodiment, the communication interface 404 may establish a wireless communications link with the mobile call transfer device 106 using anyone of the protocols and data rates used by the first communications interface 310 of the mobile call transfer device 106 discussed above.

The display device 410 of the multimedia device can be any type of display used for televisions and/or computer displays including but not limited to LCD, Plasma, etc. The speaker device 412 may be any standard speaker, such as a cone speaker used for televisions, and/or laptop computers.

Exemplary Operation of Multimedia Call Transfer

Figure 5:
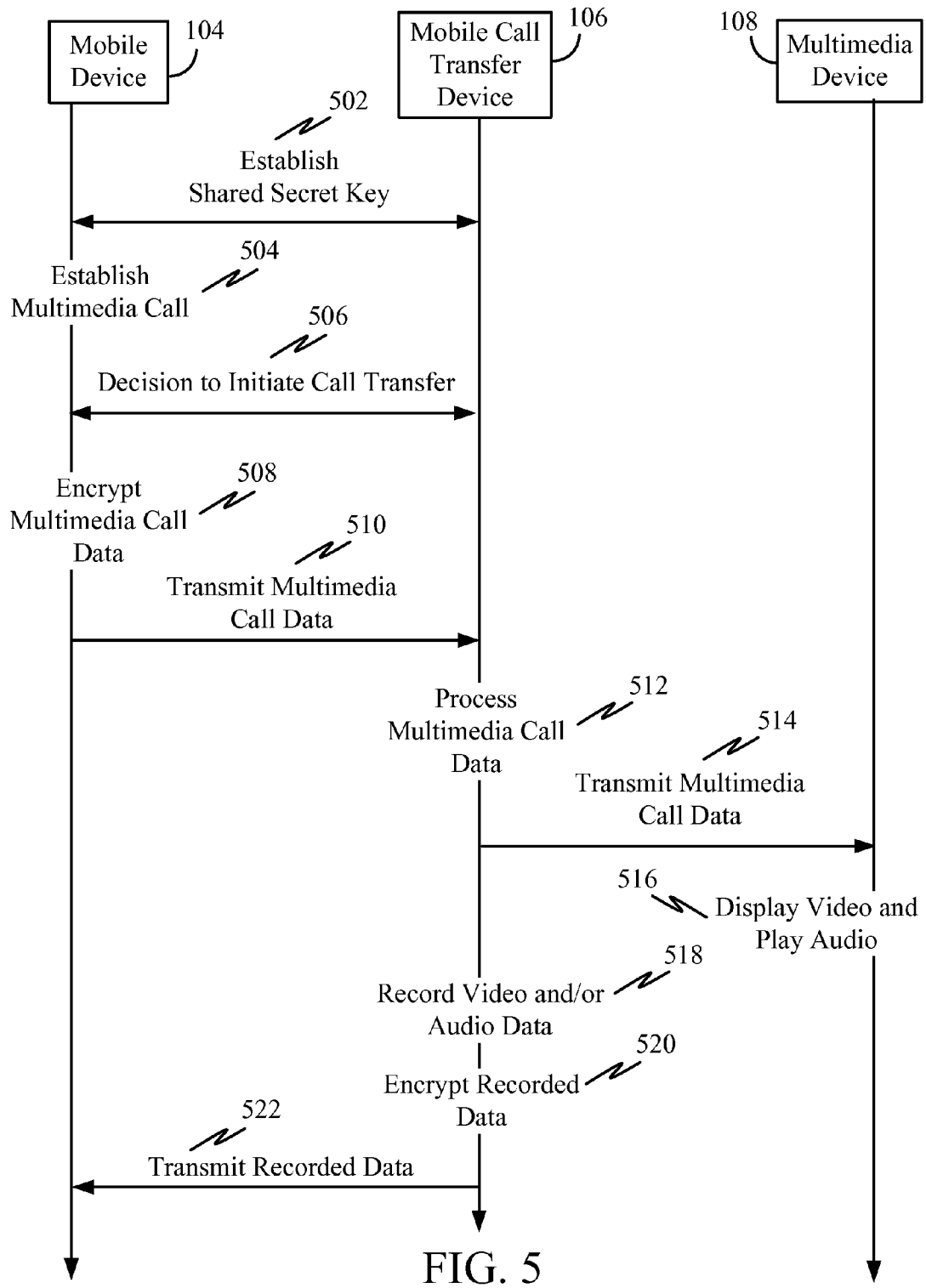
FIG. 5 illustrates a flow chart showing how multimedia call data may be transmitted to a multimedia device via a multimedia mobile call transfer device according to one embodiment.

FIG. 5 illustrates a flow chart showing how multimedia call data may be transmitted to a multimedia device 108 via a multimedia mobile call transfer device 106 according to one embodiment. At step 502, the mobile device 104 and the multimedia mobile call transfer device 106 may engage in a pairing session to establish a shared secret key. This pairing session may occur only once when the mobile call transfer device 106 is first introduced to the mobile device 104. Thereafter, session keys used to encrypt data exchanged between the devices may be established using the shared secret key. The pairing session may be in accordance with, for example, any of the pairing protocols used by Bluetooth®, Bluetooth Low Energy®, Zigbee®, Wifi, 802.11 protocols, etc. At step 504, the mobile device 104 may establish a multimedia call having video and audio data streams/components with another device in the communications network via the network node 102. For example, the network node 102 may transmit multimedia call data to the mobile device 104 where the multimedia call was initiated by another device in the communications network. Alternatively, the mobile device 104 may have initiated the multimedia call and transmitted multimedia call data to the network node 102. In some embodiments, step 502 can take place after step 504.

At step 506, a decision is made to initiate transfer of the multimedia call to the multimedia mobile call transfer device 106. This decision can take place in a variety of ways. In one example, a user of the mobile device 104 enters a command via the I/O interface 222 of the mobile device 104 to initiate multimedia call transfer. In such a case, the mobile device 104 transmits an initiation signal to the mobile call transfer device 106 that instructs the mobile call transfer device 106 to receive multimedia call data from the mobile device 104. The multimedia mobile call transfer device 106 may send back an acknowledgment message to the mobile device 104 indicating that it is ready to receive the multimedia call data. During this exchange, a session key may also be established between the mobile device 104 and the mobile call transfer device 106 that may be used to encrypt and decrypt data transmitted between the two devices.

In another example, a user of the mobile device 104 may enter a command via the I/O interface 322 of the mobile call transfer device 106 to initiate multimedia call transfer. In such a case, the mobile call transfer device 106 transmits an initiation signal to the mobile device 104 that instructs the mobile device 104 to transmit multimedia call data to the mobile call transfer device 106. The mobile device 104 may send back an acknowledgment message to the mobile call transfer device 106 indicating that it will begin to transmit the multimedia call data. During this exchange, a session key may also be established between the mobile device 104 and the mobile call transfer device 106 that may be used to encrypt and decrypt data transmitted between the two devices.

In another example, initiation of a multimedia call transfer may take place automatically when the mobile device 104 is within a predetermined physical distance and/or has a predetermined minimum signal to noise ratio (SNR) with the mobile call transfer device 106. In such a case, the mobile call transfer device 106 periodically transmits a ranging signal to the mobile device 104. If the mobile device 104 is within the predetermined range (e.g., the communications link between the mobile call transfer device 106 and mobile device 104 exceeds a minimum SNR threshold) it will receive the ranging signal and transmit back a range acknowledgement message to the mobile call transfer device 106. In one example, the acknowledgment message indicates that the wireless communications link to be established between the mobile device 104 and the mobile call transfer device 106 will be within a minimum signal to noise ratio (SNR) threshold. Thus, in one example, after the ranging acknowledgement message is transmitted to the mobile call transfer device 106, a multimedia call in progress at the mobile device 104 may be transferred to the mobile call transfer device 106. In another embodiment, after the ranging acknowledgement message is received, the mobile call transfer device 106 transmits an initiation message to the mobile device 104 requesting that the mobile device 104 commence transmission of the multimedia call data associated with the multimedia call to the multimedia mobile call transfer device 106. In one embodiment, settings on the mobile device 104 (e.g., through a software application designed for use with the mobile call transfer device 106) can be setup to allow for automatic multimedia call transfer.

Once the mobile device 104 and the mobile call transfer device 106 have initiated transfer of the multimedia call, at step 508 the mobile device 104 may encrypt multimedia call data using, for example, the session key established between the mobile device 104 and the mobile call transfer device 106. At step 510, the mobile device 104 may transmit the encrypted multimedia call data to the mobile call transfer device 106. At step 512, the mobile call transfer device 106 receives the encrypted multimedia call data and processes it using, for example, the processing circuit 302. For example, such processing may include decrypting the received multimedia call data and converting it to an output format compatible with communications link established with the multimedia device 108 via the second communications interface 316. The processing circuit 302 may be a specialized processor that performs these steps.

At step 514, the mobile call transfer device 106 may transfer the processed multimedia call data to the multimedia device 108. The processed multimedia call data may be transmitted from the second communications interface 316 of the mobile call transfer device 106 to the communications interface 404 of the multimedia device 108. At step 516, the multimedia device 108 may then display the video component of the multimedia call on its display 410, and optionally play the audio component of the multimedia call on any speakers 412 it may have. Thus, the user is now able to see the video component of the multimedia call on the multimedia device 108 which has a display that is larger than the mobile device 104, and also optionally hear the audio component of the multimedia call on the speakers of the multimedia device 108 which may provide greater volume and sound quality.

At step 518, the video camera 308 of the mobile call transfer device 106 may record images of the user (e.g., facial images of the user) to be transmitted back to the other party of the multimedia call. The microphone 306 of the mobile call transfer device 106 may also record sounds produced by the user (e.g., speech) to be transmitted back to the other party of the multimedia call. In this fashion, the user may observe and hear video and audio data transmitted by the other party to the video call on the user's multimedia device 108, and at the same time use the mobile call transfer device 106 to record the user's own images and sounds to transmit back to the other party. For example, the mobile call transfer device 106 may be placed in close proximity to the multimedia device 108. This way, the user can observe the images on the display 410 of the multimedia device 108, and also substantially face the video camera 308 of the mobile call transfer device 106 at the same time. However, step 518 is optional. In one embodiment, the mobile call transfer device 106 is not used to record video or audio data of the user. Instead, the microphone 206 and camera 208 of the mobile device 104 may be used to record audio and video data, respectively, to transmit back to the other party to the multimedia call.

In one embodiment, the processing circuit 302 of the mobile call transfer device 106 may execute an echo cancelling algorithm. For example, in the case where the user is using the microphone 306 of the mobile call transfer device 106 to record sounds to transmit back to the other party to the multimedia call, there is a fear that the microphone 306 may pick up sounds emitted by the speakers 412 of the multimedia device 108. These sounds include speech and other audio signals that were transmitted by the other party to the multimedia call. It is undesirable to transmit these sounds back to the transmitting party because otherwise the other party will hear an echo. To eliminate such a problem, the processing circuit 302 of the mobile call transfer device 106 may execute an echo cancelling algorithm that subtracts out (through for example digital filtering) the undesirable signal that is associated with specific amount of delay.

At step 520, the mobile call transfer device 106 may encrypt the recorded video and/or audio data from step 518—using for example the session key—and transmit the encrypted data back to the mobile device 104 at step 522. The mobile device 104 may then decrypt the encrypted audio and/or video data and transmit it to other party of the multimedia call via, among other network components, the network node 102.

Exemplary Method Operational at a Multimedia Mobile Call Transfer Device

FIG. 6 illustrates a flow chart for a method 600 operational at a multimedia mobile call transfer device according to one embodiment. At step 602, the mobile call transfer device receives a first video data associated with a multimedia call from a mobile device. At step 604, the mobile call transfer device receives a first audio data associated with the multimedia call from the mobile device. At step 606, the mobile call transfer device processes the received first video data and the received first audio data. Next, at step 608, the transfer device transmits the processed first video data to a multimedia device for display on the multimedia device. Then, at step 610, the transfer device transmits the processed first audio data to the multimedia device for play on speakers of the multimedia device.

In one embodiment, the multimedia mobile call transfer device: captures a second video data with a video camera; records a second audio data with a microphone; and transmits the captured second video data and the recorded second audio data to the mobile device. In another embodiment, the transfer device filters out an echo associated with the first audio data from the recorded second audio data. In yet another embodiment, the transfer device: receives an initiation command from a user via an input interface; and transmits, after receiving the initiation command, an initiation message to the mobile device requesting that the mobile device commence transmission of the first video data and the first audio data associated with the multimedia call to the multimedia mobile call transfer device.

In another embodiment, the multimedia mobile call transfer device: establishes a shared secret key with the mobile device; and derives a session key based on the shared secret key, wherein the received first video data is encrypted by the session key, and the session key is used to decrypt the encrypted received first video data. In another embodiment, the transfer device: transmits a ranging signal to the mobile device; receives a range acknowledgement message from the mobile device indicating that the wireless communications link is within a minimum signal to noise ratio (SNR) threshold; and then transmits an initiation message to the mobile device requesting that the mobile device commence transmission of the first video data associated with the multimedia call to the multimedia mobile call transfer device.

Exemplary Multimedia Mobile Call Transfer Device

Figure 7:
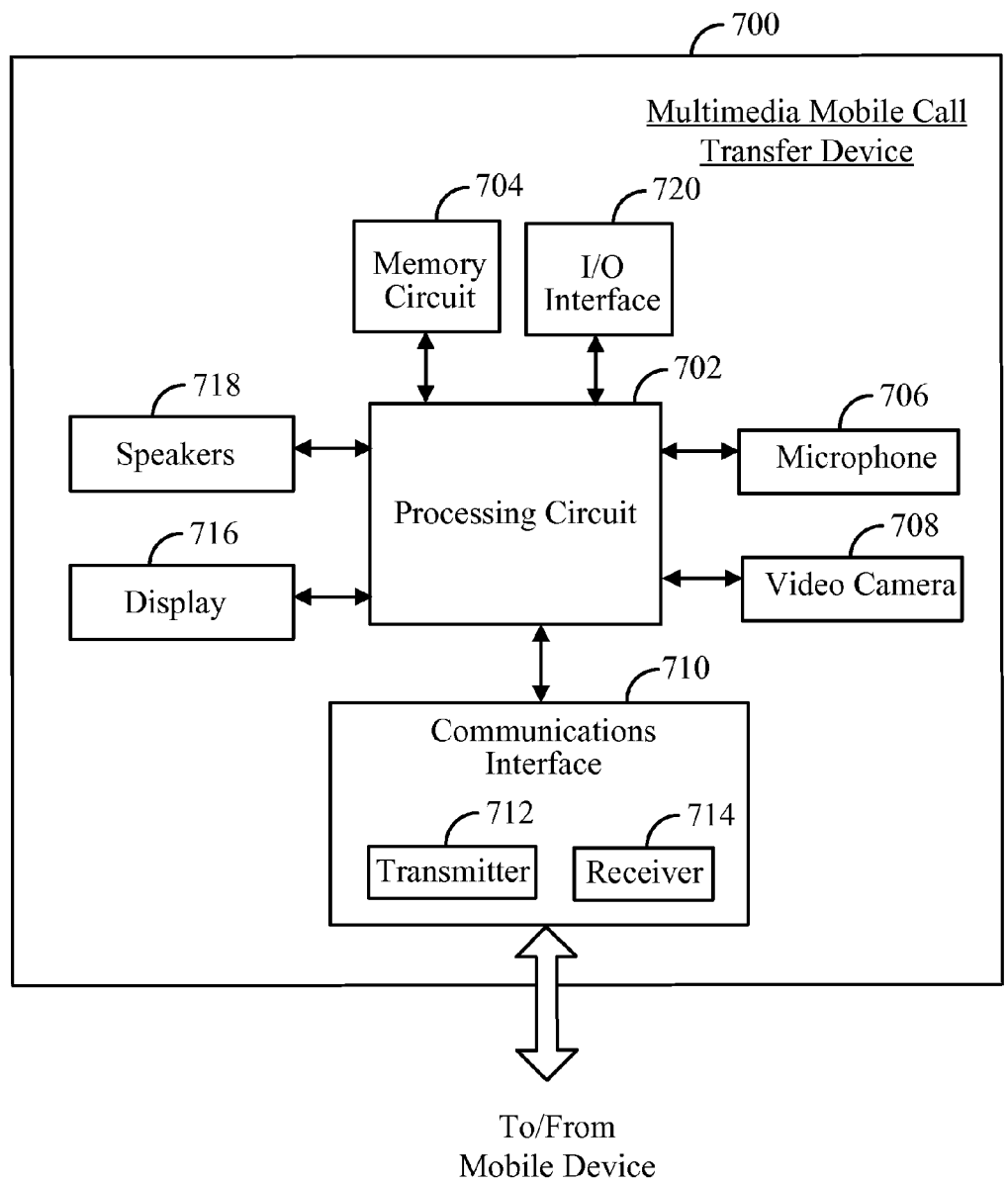
FIG. 7 illustrates a multimedia mobile call transfer device according to one embodiment.

FIG. 7 illustrates a multimedia mobile call transfer device 700 according to one embodiment. The multimedia mobile call transfer device 700 may comprise a processing circuit (e.g., processor, ASIC, processing module, etc.) 702, a memory circuit (e.g., memory module, memory, etc.) 704, a microphone 706, a video camera 708, a communications interface 710, a display device 716, a speaker device 718, and/or an input and output (I/O) interface 720.

Figure 9:
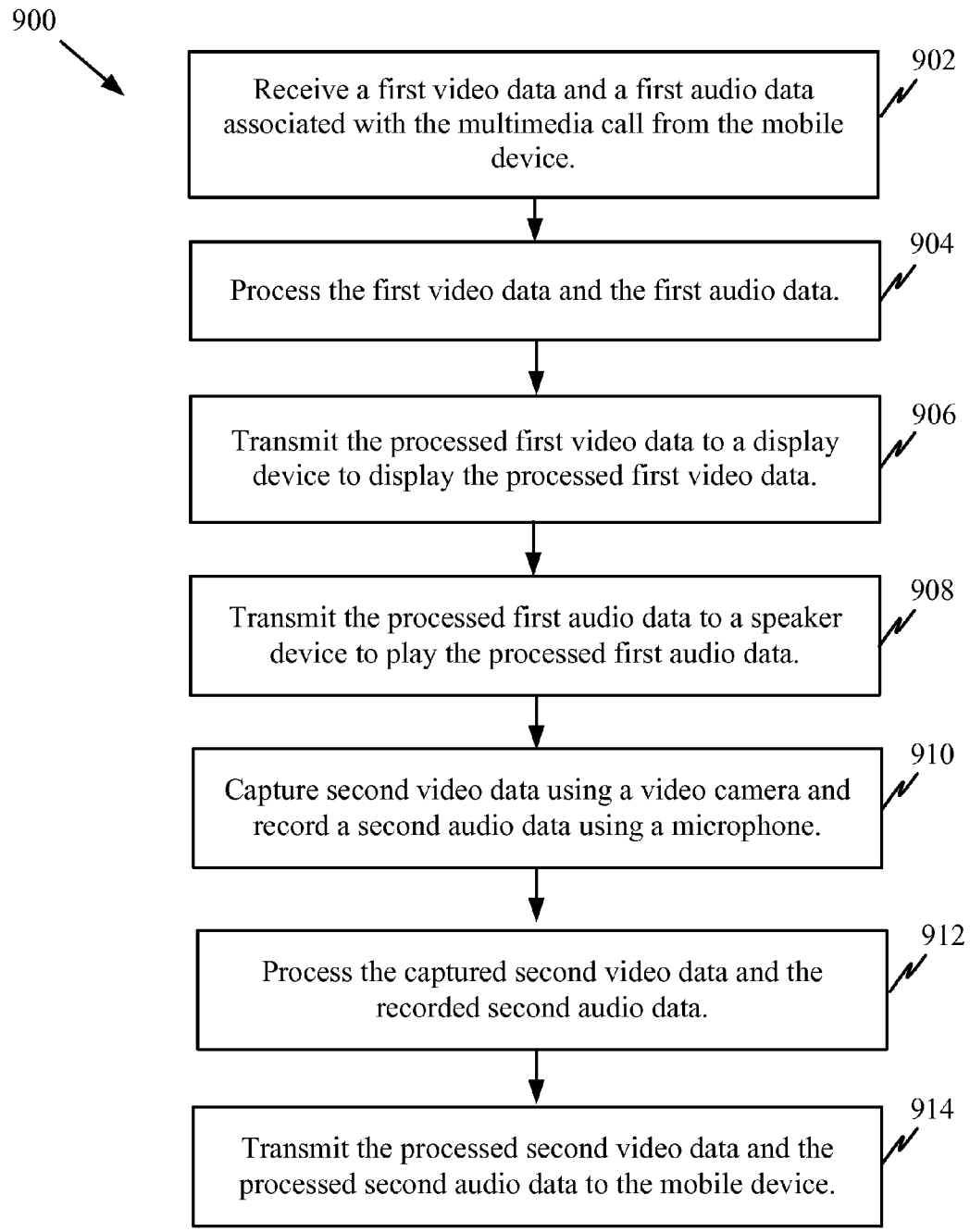
FIG. 9 illustrates a flow chart for a method operational at a multimedia mobile call transfer device according to one embodiment.

The processing circuit 702 is configured to process video and audio data, and may be an ASIC or a specialized processor that is adapted to perform any one of the steps shown in FIG. 9. The processing circuit 702 is adapted to process signals sent to and received from the other mobile call transfer device 700 components, including, but not limited to, the memory circuit 704, microphone 706, video camera 708, communications interface 710, display device 716, speaker device 718, and/or I/O interface 720. For example, the processing circuit 702 may be adapted to decrypt the multimedia call data received from the mobile device 104. As another example, the processing circuit 702 may be adapted to encrypt and transmit video and/or audio data received from the microphone 706 and/or video camera 708, respectively, to the mobile device 104 via the communications interface 710. The memory circuit 704 may be volatile and/or non-volatile memory that is adapted to store data, such audio and video data. The memory circuit 704 may also store instructions which when executed by the processing circuit 702 perform any one of the steps shown in FIG. 9. The microphone 706 is adapted to capture audio data, for example, audio data generated by a user (e.g., the voice of the user) for use in a multimedia call.

The video camera 708 is adapted to capture digital images and digital video, for example, video data generated by a user (e.g., facial images of the user) for use in a multimedia call. The video camera 708 may include a feature that allows it to zoom in on a user's face who might be sitting across the video camera 708 at some distance, for example, 5 to 20 feet. In one embodiment, the location the video camera 708 is focusing in on may be adjusted manually by the user. For example, the video camera 708 may swivel around allowing the user to adjust the video camera's 708 angle by hand. In another embodiment, the location the video camera 708 is focusing in on may be adjusted by remote control. For example, the user may execute a command via the I/O interface 222 of the wireless device to transit a signal to the mobile call transfer device 700 instructing the video camera 708 to swivel into a desired position.

The communications interface 710 allows the mobile call transfer device 700 to wirelessly communicate with the mobile device 104. Specifically, the communications interface 710 establishes a wireless connection with the first communications interface 210 of the wireless device 104. The communications interface 710 may include a transmitter 712 and a receiver 714 that each respectively transmits and receives multimedia call data to/from the mobile device 104. The communications interface 710 may use a Bluetooth®, Bluetooth Low Enegry®, Zigbee®, Wifi, 802.11 standard, and/or another wireless communications protocol that is capable of transmitting and receiving data at rates which can support the transmission and reception of high definition video data and audio data. For example, in one embodiment, the communications interface 710 can establish a wireless communications link with the mobile device 104 that can support the transmission and reception of up to 10 Megabits per second. In another embodiment, the communications interface 710 can establish a wireless communications link with the mobile device 104 that can support the transmission and reception of up to 100 Megabits per second. In yet another embodiment, the communications interface 710 can establish a wireless communications link with the mobile device 104 that can support the transmission and reception of up to 1000 Megabits per second.

The display device 716 of the multimedia device can be any type of display used for televisions and/or computer displays including but not limited to LCD, Plasma, etc. The speaker device 718 may be any standard speaker, such as a cone speaker used for televisions, and/or laptop computers. The I/O interface 720 may include a plurality of buttons, lights, and/or infrared receivers. One or more buttons, for example, may allow a user to enter commands that causes the mobile call transfer device 700 to transmit signals to the mobile device 104 that establishes a communications link between the two devices in order to transfer multimedia call data. Another button may be used to turn on or off the mobile call transfer device 700.

Exemplary Operation of Multimedia Call Transfer

Figure 8:
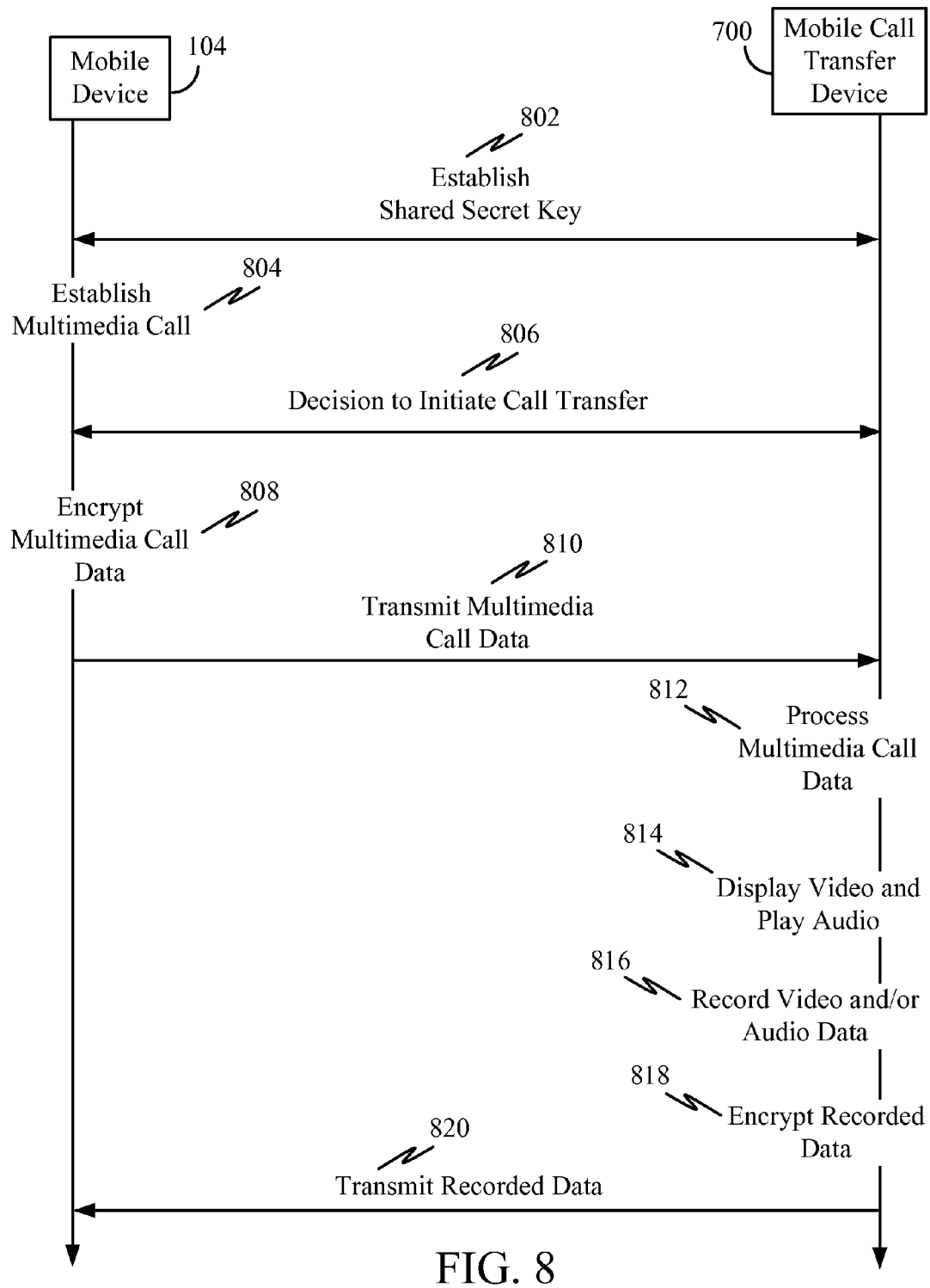
FIG. 8 illustrates a flow chart showing how multimedia call data may be transmitted to a multimedia mobile call transfer device according to one embodiment.

FIG. 8 illustrates a flow chart showing how multimedia call data may be transmitted to a multimedia mobile call transfer device 700 according to one embodiment. At step 802, the mobile device 104 and the multimedia mobile call transfer device 700 may engage in a pairing session to establish a shared secret key. This pairing session may occur only once when the mobile call transfer device 700 is first introduced to the mobile device 104. Thereafter, session keys used to encrypt data exchanged between the devices may be established using the shared secret key. The pairing session may be in accordance with, for example, any of the pairing protocols used by Bluetooth®, Bluetooth Low Energy®, Zigbee®, Wifi, 802.11 protocols, etc. At step 704, the mobile device 104 may establish a multimedia call having video and audio data streams/components with another device in the communications network via the network node 102. For example, the network node 102 may transmit multimedia call data to the mobile device 104 where the multimedia call was initiated by another device in the communications network. Alternatively, the mobile device 104 may have initiated the multimedia call and transmitted multimedia call data to the network node 102. In some embodiments, step 802 can take place after step 804.

At step 806, a decision is made to initiate transfer of the multimedia call to the multimedia mobile call transfer device 700. This decision can take place in a variety of ways. In one example, a user of the mobile device 104 enters a command via the I/O interface 222 of the mobile device 104 to initiate multimedia call transfer. In such a case, the mobile device 104 transmits an initiation signal to the mobile call transfer device 700 that instructs the mobile call transfer device 700 to receive multimedia call data from the mobile device 104. The multimedia mobile call transfer device 700 may send back an acknowledgment message to the mobile device 104 indicating that it is ready to receive the multimedia call data. During this exchange, a session key may also be established between the mobile device 104 and the mobile call transfer device 700 that may be used to encrypt and decrypt data transmitted between the two devices.

In another example, a user of the mobile device 104 may enter a command via the I/O interface 720 of the mobile call transfer device 700 to initiate multimedia call transfer. In such a case, the mobile call transfer device 700 transmits an initiation signal to the mobile device 104 that instructs the mobile device 104 to transmit multimedia call data to the mobile call transfer device 700. The mobile device 104 may send back an acknowledgment message to the mobile call transfer device 700 indicating that it will begin to transmit the multimedia call data. During this exchange, a session key may also be established between the mobile device 104 and the mobile call transfer device 700 that may be used to encrypt and decrypt data transmitted between the two devices.

In another example, initiation of a multimedia call transfer may take place automatically when the mobile device 104 is within a predetermined physical distance and/or has a predetermined minimum signal to noise ratio (SNR) with the mobile call transfer device 700. In such a case, the mobile call transfer device 700 periodically transmits a ranging signal to the mobile device 104. If the mobile device 104 is within the predetermined range (e.g., the communications link between the mobile call transfer device 700 and mobile device 104 exceeds a minimum SNR threshold) it will receive the ranging signal and transmit back a range acknowledgement message to the mobile call transfer device 700. In one example, the acknowledgment message indicates that the wireless communications link to be established between the mobile device 104 and the mobile call transfer device 700 will be within a minimum signal to noise ratio (SNR) threshold. Thus, in one example, after the ranging acknowledgement message is transmitted to the mobile call transfer device 700, a multimedia call in progress at the mobile device 104 may be transferred to the mobile call transfer device 700. In another embodiment, after the ranging acknowledgement message is received, the mobile call transfer device 700 transmits an initiation message to the mobile device 104 requesting that the mobile device 104 commence transmission of the multimedia call data associated with the multimedia call to the multimedia mobile call transfer device 700. In one embodiment, settings on the mobile device 104 (e.g., through a software application designed for use with the mobile call transfer device 700) can be setup to allow for automatic multimedia call transfer.

Once the mobile device 104 and the mobile call transfer device 700 have initiated transfer of the multimedia call, at step 808 the mobile device 104 may encrypt multimedia call data using, for example, the session key established between the mobile device 104 and the mobile call transfer device 700. At step 810, the mobile device 104 may transmit the encrypted multimedia call data to the mobile call transfer device 700. At step 812, the mobile call transfer device 700 receives the encrypted multimedia call data and processes it using, for example, the processing circuit 802. For example, such processing may include decrypting the received multimedia call data. The processing circuit 802 may be a specialized processor that performs these steps.

At step 814, the mobile call transfer device 700 may then display the video component of the multimedia call on its display device 716, and optionally play the audio component of the multimedia call on any speakers 718 it may have. Thus, the user is now able to see the video component of the multimedia call on the mobile call transfer device 700 which has a display that is larger than the mobile device 104, and also optionally hear the audio component of the multimedia call on the speakers of the mobile call transfer device 700 which may provide greater volume and sound quality.

At step 816, the video camera 708 of the mobile call transfer device 700 may record images of the user (e.g., facial images of the user) to be transmitted back to the other party of the multimedia call. The microphone 706 of the mobile call transfer device 700 may also record sounds produced by the user (e.g., speech) to be transmitted back to the other party of the multimedia call. In this fashion, the user may observe and hear video and audio data transmitted by the other party to the video call on the user's mobile call transfer device 700, and at the same time use the mobile call transfer device 700 to record the user's own images and sounds to transmit back to the other party.

At step 818, the mobile call transfer device 700 may encrypt the recorded video and/or audio data from step 816—using for example the session key—and transmit the encrypted data back to the mobile device 104 at step 820. The mobile device 104 may then decrypt the encrypted audio and/or video data and transmit it to other party of the multimedia call via, among other network components, the network node 102

Exemplary Method Operational at a Multimedia Mobile Call Transfer Device

FIG. 9 illustrates a flow chart for a method 900 operational at a multimedia mobile call transfer device according to one embodiment. At step 902, the mobile call transfer device receives a first video data and a first audio data associated with the multimedia call from the mobile device. At step 904, the mobile call transfer device processes the first video data and the first audio data. At step 906, the mobile call transfer device transmits the processed first video data to a display device to display the processed first video data. Next, at step 908, the transfer device transmits the processed first audio data to a speaker device to play the processed first audio data. Next, at step 910, the transfer device captures second video data using a video camera and record a second audio data using a microphone. Next, at step 912, the transfer device processes the captured second video data and the recorded second audio data. Then, at step 914, the transfer device transmits the processed second video data and the processed second audio data to the mobile device.

In one embodiment, synchronization of the video and audio signals with one another as they are being sent to the other party may take place so that the other party receives a visual image in tune with what is being heard. The processing circuits 302, 802 of the mobile call transfer devices 106, 700 may synchronize the video and audio signals captured by taking into account propagation and processing delays for each video and audio signal and adjusting transmission of each to the mobile device 104. Further synchronization of the signals may also take place at the mobile device 104. A software application resident on the mobile device 104 may assist with such synchronization.

One or more of the components, steps, features and/or functions illustrated in FIGS. 1, 2, 3, 4, 5, 6, 7, 8, and/or 9, may be rearranged and/or combined into a single component, step, feature or function or embodied in several components, steps, or functions. Additional elements, components, steps, and/or functions may also be added without departing from the invention. The apparatus, devices, and/or components illustrated in FIGS. 1, 2, 3, 4, and/or 7 may be configured to perform one or more of the methods, features, or steps described in FIGS. 5, 6, 8, and/or 9. The algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

I claim:

1. A multimedia mobile call transfer device, comprising:
an input interface adapted to receive an initiation command;
a first communications interface adapted to provide a wireless communications link with a mobile device, the mobile device configured to wirelessly communicate with a cellular telephone communication network;
a second communications interface adapted to provide another communications link with a multimedia device; and
a processing circuit communicatively coupled to the first communications interface, the second communications interface, and the input interface, the processing circuit adapted to
transmit, upon receipt of the initiation command, an initiation message to the mobile device requesting that the mobile device commence transmission of a first video data associated with a multimedia call to the multimedia mobile call transfer device,
receive the first video data associated with the multimedia call from the mobile device, the multimedia call being a call communicated over the cellular telephone communication network, process the received first video data, and
transmit the processed first video data to the multimedia device for display on the multimedia device.

2. The multimedia mobile call transfer device of claim 1, wherein the processing circuit is further adapted to:
receive a first audio data associated with the multimedia call from the mobile device;
process the received first audio data; and
transmit the processed first audio data to the multimedia device for play on one or more speakers of the multimedia device.

3. The multimedia mobile call transfer device of claim 1, further comprising:
a video camera communicatively coupled to the processing circuit, the video camera adapted to capture a second video data; and
wherein the processing circuit is further adapted to transmit the captured second video data to the mobile device for further transmission over the cellular telephone communication network.

4. The multimedia mobile call transfer device of claim 1, further comprising:
a microphone communicatively coupled to the processing circuit, the microphone adapted to capture a second audio data; and
wherein the processing circuit is further adapted to transmit the captured second audio data to the mobile device for further transmission over the cellular telephone communication network.

5. The multimedia mobile call transfer device of claim 1, wherein the processing circuit is further adapted to:
establish a shared secret key with the mobile device; and
derive a session key based on the shared secret key, wherein the received first video data is encrypted by the session key, and the session key is used to decrypt the encrypted received first video data.

6. The multimedia mobile call transfer device of claim 1, wherein the processing circuit is further adapted to:
transmit a ranging signal to the mobile device; and
receive a range acknowledgement message from the mobile device indicating that at least one of (a) the wireless communications link exceeds a minimum signal to noise ratio (SNR) threshold, and/or (b) the mobile device is within a predetermined physical distance of the multimedia mobile call transfer device.

7. The multimedia mobile call transfer device of claim 6, wherein after receiving the range acknowledgement message from the mobile device the processing circuit is further adapted to:
transmit an initiation message to the mobile device requesting that the mobile device commence transmission of the first video data associated with the multimedia call to the multimedia mobile call transfer device.

8. The multimedia mobile call transfer device of claim 3, wherein the video camera is further adapted to detect a face of a user and zoom in on the face of the user.

9. The multimedia mobile call transfer device of claim 1, further comprising:
a video camera communicatively coupled to the processing circuit, the video camera adapted to capture a second video data; and
a microphone communicatively coupled to the processing circuit, the microphone adapted to capture a second audio data, wherein the processing circuit is further adapted to
synchronize the captured second video data with the captured second audio data in time, and
transmit the synchronized second video data with the second audio data to the mobile device.

10. A method operational at a multimedia mobile call transfer device, the method comprising:
receiving an initiation command from an input interface;
transmitting, upon receipt of the initiation command, an initiation message to a mobile device requesting that the mobile device commence transmission of a first video data associated with a multimedia call to the multimedia mobile call transfer device;
receiving the first video data associated with the multimedia call from the mobile device, the mobile device configured to wirelessly communicate with a cellular telephone communication network, and the multimedia call being a call communicated over the cellular telephone communication network;
receiving a first audio data associated with the multimedia call from the mobile device;
processing the received first video data and the received first audio data;
transmitting the processed first video data to a multimedia device for display on the multimedia device; and
transmitting the processed first audio data to the multimedia device for playing on one or more speakers of the multimedia device.

11. The method of claim 10, further comprising:
capturing a second video data with a video camera;
capturing a second audio data with a microphone; and
transmitting the captured second video data and the captured second audio data to the mobile device for further transmission over the cellular telephone communication network.

12. The method of claim 11, further comprising:
filtering out an echo associated with the first audio data from the captured second audio data.

13. The method of claim 10, further comprising:
establishing a shared secret key with the mobile device; and
deriving a session key based on the shared secret key, wherein the received first video data is encrypted by the session key, and the session key is used to decrypt the encrypted received first video data.

14. The method of claim 10, further comprising:
transmitting a ranging signal to the mobile device; and
receiving a range acknowledgement message from the mobile device indicating that at least one of (a) the wireless communications link exceeds a minimum signal to noise ratio (SNR) threshold, and/or (b) the mobile device is within a predetermined physical distance of the multimedia mobile call transfer device.

15. The method of claim 14, wherein after receiving the range acknowledgement message from the mobile device, the method further comprises:
transmitting an initiation message to the mobile device requesting that the mobile device commence transmission of the first video data associated with the multimedia call to the multimedia mobile call transfer device.

16. An apparatus comprising:
a communications interface adapted to provide a wireless communications link with a mobile device configured to wirelessly communicate with a cellular telephone communication network;

a display device adapted to display a first video data associated with a multimedia call, the multimedia call being a telephone call communicated over the cellular telephone communication network;

a speaker device adapted to play a first audio data associated with the multimedia call; and a processing circuit communicatively coupled to the communications interface, the display device, and the speaker device, the processing circuit adapted to transmit a ranging signal to the mobile device, receive a range acknowledgement message from the mobile device indicating that at least one of (a) the wireless communications link exceeds a minimum signal to noise ratio (SNR) threshold, and/or (b) the mobile device is within a predetermined physical distance of the apparatus, transmit an initiation message to the mobile device requesting that the mobile device commence transmission of the first video data associated with the multimedia call to the apparatus device, receive the first video data and the first audio data associated with the multimedia call from the mobile device, process the first video data and the first audio data, transmit the processed first video data to the display device to display the processed first video data, and transmit the processed first audio data to the speaker device to play the processed first audio data.

17. The apparatus of claim 16, further comprising:

a microphone communicatively coupled to the processing circuit, the microphone adapted to capture a second audio data; and a video camera communicatively coupled to the processing circuit, the video camera adapted to capture a second video data, wherein the processing circuit is further adapted to process the captured second video data and the captured second audio data, and transmit the processed second video data and the processed second audio data to the mobile device.

18. The apparatus of claim 17, wherein processing the captured second video data and the captured second audio data includes:

synchronizing the captured second video data with the captured second audio data in time.

19. The apparatus of claim 16, further comprising:

an input interface adapted to receive an initiation command, and wherein the processing circuit is further adapted to transmit an initiation message to the mobile device requesting that the mobile device commence transmission of the first video data associated with the multimedia call to the apparatus.

* * * * *